T. J. SMULSKI.
RESILIENT WHEEL.
APPLICATION FILED JUNE 5, 1914.
1,141,498.
Patented June 1, 1915.
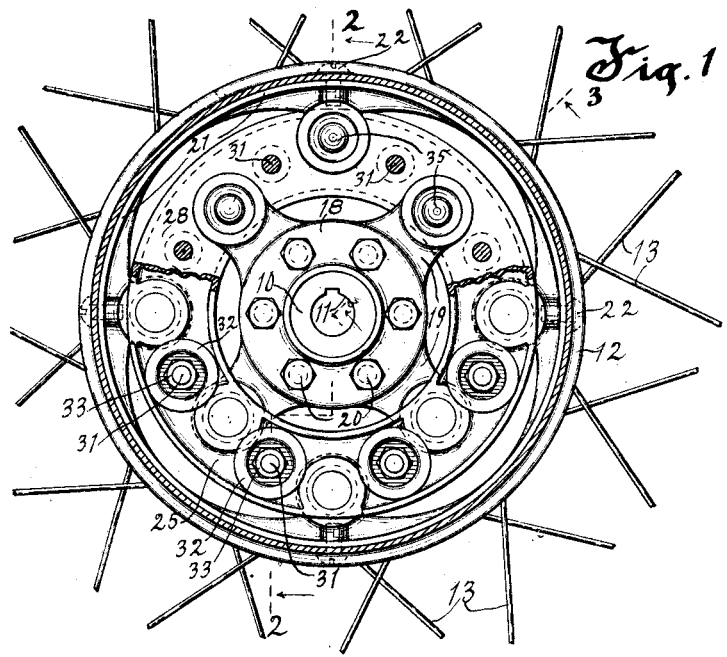
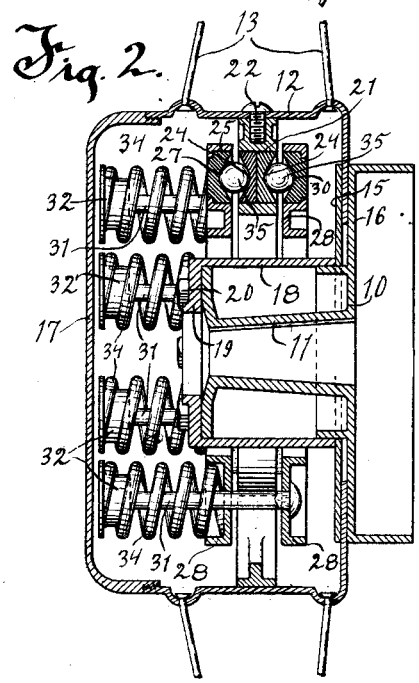
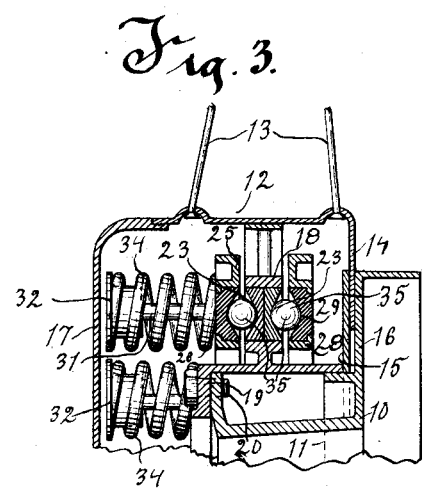
WITNESSES.
C. H. Miller
E. Schowalter
INVENTOR
Theodore J. Smulski.
By Morsell, Keeney & French,
ATTORNEYS.

UNITED STATES PATENT OFFICE.

THEODORE J. SMULSKI, OF MILWAUKEE, WISCONSIN.

RESILIENT WHEEL.

1,141,498. Specification of Letters Patent. Patented June 1, 1915.

Application filed June 5, 1914. Serial No. 843,172.

*To all whom it may concern:*

Be it known that I, THEODORE J. SMULSKI, subject of the Emperor of Austria-Hungary, and resident of Milwaukee, in the county of Milwaukee and State of Wisconsin, have invented new and useful Improvements in Resilient Wheels, of which the following is a description, reference being had to the accompanying drawings, which are a part of this specification.

The invention relates to resilient wheels.

The invention designs to provide a resilient wheel of the spring wheel type, having movable wheel members resiliently supported.

The invention further designs to provide a wheel of the class described for use on vehicle wheels or on any other wheel or hub for pulleys, drums and the like.

The invention further designs to provide a wheel resilient in a vertical plane for movement of the hub within the wheel in that plane against the action of resilient means disposed in a horizontal plane.

The invention further designs to provide a resilient wheel having two members coöperating with a resilient or spring means, an inwardly projecting portion of the wheel and an outwardly projecting portion of the hub being disposed between said members so as to provide a cushioning means for the hub and wheel.

The invention further designs to provide a new and improved form of resilient wheel.

The invention consists in the several features hereinafter set forth and more particularly defined by claims at the conclusion hereof.

In the drawings, Figure 1 is an elevation of the device embodying the invention, parts being broken away and parts being shown in section. Fig. 2 is a section taken on the line 2—2 of Fig. 1; Fig. 3 is a section taken on the line 3—3 of Fig. 1; Figs. 4, 5 and 6 are detail views of the bearings and the seats therefor.

The invention is shown as applied to a vehicle wheel comprising an inner movable wheel member 10 having an aperture 11 therein for receiving the wheel axle, and an outer movable wheel member 12 which may be connected to the wheel rim by spokes 13.

The means for cushioning the movable wheel members is disposed within the outer member 12 which forms a casing therefor, the depending flange portion 14 of the outer member being movable within the collar 15 and a flange 16 on the inner member 10, and a cover 17 is detachably secured to the outer member. This construction serves to efficiently house the resilient means and exclude dust and dirt therefrom.

The means for cushioning the wheel comprises a bearing cup holding member 18 having a flange 19 which is secured to the inner member 10 by any suitable means such as bolts 20, and a bearing cup holding member 21 which is secured by means such as bolts or screws 22 to the interior of the outer member 12.

The member 18 extends outwardly from the inner member 10 and is provided with a plurality of bearing cups 23 on either side of the outwardly projecting portion, and the member 21 extends inwardly from the outer member 12 and is provided with bearing cups 24 on either side, similar to those of the member 18, and these cups are in the inwardly projecting portion of said member. Those portions of the members 18 and 21 carrying the bearing cups 23 and 24 are disposed in the same vertical plane.

A floating ring 25 is disposed opposite one side of the members 18 and 21 and is provided with bearing cups 26 which register with the bearing cups 23 on one side of the member 18, and similar bearing cups 27 which register with bearing cups 24 on the same side of the member 21.

A floating ring 28 similar to the ring 25 is disposed opposite to the other side of the members 18 and 21, and is provided with bearing cups 29 and 30 which register respectively with the bearing cups 23 and 24 on the members 18 and 21 disposed adjacent thereto. These two rings 25 and 28 are operatively connected together by a plurality of bolts 31, whose heads 31' are seated in the ring 28 and which carry heads 32 secured by nuts 33 at the other ends thereof, so that a spring 34 may be interposed between the ring 25 and the head 32 of each of the bolts. This plurality of springs 34 disposed between the heads 32 and the ring 25 will act upon the side of the ring 25, and will resist any lateral movement of either ring 25 or 28.

The bearing cups in the members 18 and 21 and in the rings 25 and 28 which register with them, provide seats for the ball bearings 35 which are disposed between the ring 25 and 28 and the members 18 and 21.

The bearing cups have seats therein which may be made on different curves for adapting the device to different uses. In the drawings, Fig. 6 shows a bearing seat which is designed for a light load, Fig. 5 one which is designed for a medium load, and Fig. 4 one designed for a heavy load,—the continuation of the lower curved portion being more or less abrupt as the use of the device may require.

The bolts 31, as previously pointed out, serve to connect the rings 25 and 28, and the springs 34 acting against one face of the ring 25 serve to hold both rings in position adjacent the respective sides of the members 18 and 21, and also to hold the bearings 35 disposed therebetween.

The operation of the device is as follows: Any vertical movement of the outer or inner wheel members 12 and 10 with respect to each other, will cause a like movement of the members 21 and 18 which are connected to them respectively, which will move the ball bearings 35 causing them to ascend or descend in the seats 23 and 29, 23 and 26, 24 and 27, 24 and 30. This will result in the exertion of an outward force against the sides of the rings 25 and 18, which force will be counteracted by an opposite force exerted by the springs 34. Thus it follows that for every vertical movement of the inner and outer movable wheel members with respect to each other, there will be a corresponding vertical movement of the rings 25 and 28, and an outward movement causing the exertion of a force in a horizontal plane, which force will be counteracted by an opposite force exerted by the springs 34 in that plane. It also follows that each of the rings 25 and 28 will move as a unit, and that each of the springs 34 will take an equal proportion of the load exerted by said rings. In the use of the device on traction wheels, it will be apparent that it will be necessary to provide springs 34 of a strength sufficient to overcome and exceed the tractive force applied to the wheels.

The invention thus exemplifies a resilient wheel in which vertical movement of the movable members of the wheel is resisted and counteracted by the horizontal movement of the cushion means.

The invention is not to be restricted to the details of construction herein set forth, but may be varied so as to be within the scope of the appended claims.

What I claim as my invention is:

1. In a resilient wheel, the combination of a plurality of movable wheel members, each of said members having bearing cup holding members secured thereto, floating bearing cup holding rings disposed on either side of said bearing cup holding members, a plurality of bearings in the cups formed by said cup holding members and rings, and means for resiliently securing said bearings within the cups comprising means secured to one of said rings, a plurality of springs mounted on said last named means respectively and operatively connected to the other of said rings.

2. In a resilient wheel, the combination of a pair of movable wheel members, a bearing cup holding member secured to each of said members, a ring on either side of said bearing cup holding members having bearing cups registering with the bearings cups in said members, bearings disposed in the cups formed by said rings and said cup holding members, a plurality of bolts secured to one of said rings, and a plurality of springs mounted on said bolts respectively and operatively connected to the other of said rings, said springs being disposed in a plane opposite to the plane of movement of said movable wheel members and acting uniformly on said rings to resist outward movement thereof.

3. A resilient wheel comprising movable wheel members, a plurality of floating rings between said members, a plurality of bolts secured to one of said rings, a plurality of springs mounted on said bolts respectively and bearing against the other ring, and means on both of said movable members and said rings for permitting the rings to move outwardly against the action of said springs.

4. A resilient wheel comprising movable wheel members, a plurality of floating rings between said members, spring-securing means secured to one of said rings, a plurality of springs mounted on said securing means respectively and bearing against the other ring, and means on both of said movable members and said rings for permitting the rings to move outwardly against the action of said springs.

5. A resilient wheel comprising movable wheel members, a plurality of floating rings between said members, spring-securing means fixedly secured to one of said rings and slidably mounted in the other ring, a plurality of springs mounted on said securing means respectively and bearing against said other ring, and means on both of said movable members and said rings for permitting the rings to move outwardly against the action of said springs.

In testimony whereof, I affix my signature, in presence of two witnesses.

THEODORE J. SMULSKI.

Witnesses:
J. J. KOAMALSKI,
EMILY SCHOWALTER.